(12) United States Patent
Alford et al.

(10) Patent No.: US 11,263,297 B2
(45) Date of Patent: Mar. 1, 2022

(54) DYNAMIC INSERTION OF VARIABLIZED SECRETS IN A PIPELINE INTEGRATION SYSTEM

(71) Applicant: Pivotal Software, Inc., San Francisco, CA (US)

(72) Inventors: Jesse Thomas Alford, Denver, CO (US); Jeremy Scott Alvis, Highlands Ranch, CO (US); Justin Tyler Archie, Denver, CO (US); Kira Combs Boyle, Denver, CO (US); Christy M. Cattin, Denver, CO (US); Nadja Brigitte Conklin, Denver, CO (US); John Frederick Cornish, IV, Golden, CO (US); John Patrick McBride, Denver, CO (US)

(73) Assignee: Pivotal Software, Inc., Palo Alto, CA (US)

( * ) Notice: Subject to any disclaimer, the term of this patent is extended or adjusted under 35 U.S.C. 154(b) by 291 days.

(21) Appl. No.: 16/536,225

(22) Filed: Aug. 8, 2019

(65) Prior Publication Data
US 2021/0042148 A1 Feb. 11, 2021

(51) Int. Cl.
| | | |
|---|---|---|
| *G06F 21/30* | (2013.01) | |
| *G06F 21/31* | (2013.01) | |
| *H04L 29/06* | (2006.01) | |
| *G06F 21/44* | (2013.01) | |
| *G06F 9/48* | (2006.01) | |
| *G06F 21/57* | (2013.01) | |
| *G06F 9/46* | (2006.01) | |

(52) U.S. Cl.
CPC ............. *G06F 21/30* (2013.01); *G06F 9/466* (2013.01); *G06F 9/4843* (2013.01); *G06F 21/31* (2013.01); *G06F 21/44* (2013.01); *G06F 21/57* (2013.01); *H04L 63/08* (2013.01); *H04L 63/10* (2013.01); *G06F 2221/034* (2013.01)

(58) Field of Classification Search
None
See application file for complete search history.

(56) References Cited

PUBLICATIONS

"Concourse Pipeline Resource", Jun. 2018, pp. 1-5. (Year: 2018).*
Github.com [online], "Concourse Pipeline Resource," Concourse resource for interacting with concourse pipelines, available on or before Oct. 21, 2019, retrieved from: URL <https://github.com/concourse/concourse-pipeline-resource>, 5 pages.

* cited by examiner

*Primary Examiner* — Qing Yuan Wu
(74) *Attorney, Agent, or Firm* — Fish & Richardson P.C.

(57) ABSTRACT

Methods, systems, and apparatus, including computer programs encoded on computer storage media, for dynamically injecting secrets in a pipeline integration system. One of the methods includes receiving, by a pipeline controller, a job identifying a pipeline for executing a plurality of tasks. A preparatory task is invoked for the pipeline that obtains one or more original task definitions for the identified pipeline and generates one or more modified task definitions for the pipeline, wherein each modified task definition references one or more variablized secret names specified as the value of the reserved variable of the one or more configuration files. One or more subsequent execution tasks are invoked using each respective modified task definition. One or more retrieved secrets are injected into an execution environment for each particular execution task.

21 Claims, 4 Drawing Sheets

DYNAMIC INSERTION OF VARIABLIZED SECRETS IN A PIPELINE INTEGRATION SYSTEM

BACKGROUND

This specification generally relates to cloud computing platforms, and more particularly to cloud-based pipeline integration systems.

"Platform-as-a-Service" (commonly referred to as "PaaS") technologies provide an integrated solution that enables a web developer, or an application developer in general, to build, deploy, and manage the life cycle of a cloud-based workload, e.g., a web application or any other type of networked application. For brevity, in this specification, a PaaS system will also be referred to as a cloud computing platform or simply a platform. Supporting the cloud-based platform is an underlying cloud computing infrastructure that is operated and maintained by a service provider that may or may not be maintained by a different entity than the platform itself. The underlying cloud computing infrastructure includes hardware resources, e.g., processors or servers, upon which workloads physically execute, as well as other resources, e.g., disks or networks that can be used by the workloads.

Cloud computing platforms can provide workloads with access to software and hardware resources. For example, some cloud computing platforms provide integrated services. A service is a software subsystem that can provide one or more functionalities for use by platform workloads. An example of a service for use by a platform workload is a database management system that maintains a database that can be accessed and modified by platform workloads. The software and hardware resources to implement a service can be provisioned automatically by the platform, either in advance or on demand.

A developer using a cloud computing platform can leave logistics of provisioning and scaling hardware and software resources, e.g., processing power, facilities, power and bandwidth, data storage, and database access, to the cloud computing platform. By providing the hardware and software resources required to run a cloud based application, a cloud computing platform enables developers to focus on the development of an application itself.

Commonly, access to such hardware and software resources require authentication. Different resources may require different authentication technologies and different secrets. For example, a cloud-based workload may have one secret for accessing the platform itself, another secret for scaling up hardware resources in the underlying computing infrastructure, another secret for accessing a backend database, and another secret for integrating a third-party application utility.

In this specification, a secret is one or more items of data that allow a particular platform workload to access a resource. Thus, a secret can function as a credential for accessing a resource. For example, an application can access a database by providing a secret that authenticates the application to the database.

A cloud-based pipeline integration system is a software subsystem that can automate many aspects of using cloud computing platforms. Generally a pipeline takes as input a definition of a set of tasks, referred to as a job, that are to be executed in a particular order or in a partial order. A pipeline controller then effectuates the pipeline by executing each of the tasks as specified as workloads of the cloud computing platform.

Pipeline integration systems can be used to automate any appropriate job. One common job performed by pipeline integration systems is continuous integration and deployment of applications on the cloud-based platform. A continuous integration pipeline can include tasks that handle building, staging, testing, and deploying a new release of a developer application. Each of these stages can be implemented as a cloud-based workload that also executes on the platform.

Pipelines often break when they are too closely coupled to the tasks that they are supposed to be automating. This problem frequently arises due to secrets management because secrets tend to change at a much faster rate than the pipelines themselves. Although pipeline integration systems can use secrets management systems to manage the values of the secrets themselves, the pipeline can still break when the topology of the secrets changes. When this happens, the tasks that are executed by the pipeline integration system can lack the secrets needed to execute properly because the pipeline integration system had no visibility into the existence of the secret.

For example, if an application to be deployed uses a database and the next version of the database adds an encryption layer with its own secret, the secrets topology of the job will have changed. Typically to handle such a change in secrets topology, the task definitions of the pipeline are modified to match the changing secrets topology.

However, this is a tedious and error prone process even for operators that control their entire platform stacks. And platform operators that do not control their entire platform stack must rely on other entities to reconfigure the pipeline when there is a change in the secrets topology. For example, often in a large organizations, one team will be in charge of building and maintaining a pipeline that other teams use for deploying applications. A team that makes a change in the secrets topology incurs delays because they must wait for a corresponding change to be made to the pipeline itself to accommodate the change in secrets topology.

SUMMARY

This specification describes a pipeline integration system that can dynamically discover secrets during pipeline execution. To do so, a pipeline controller uses a preparatory task to find variablized secrets in input configuration files. The preparatory task then generates modified task definitions that allow the secrets to be injected into the execution environments of the execution task. These techniques allow the secrets topology of a job to change without requiring a change to the pipeline itself.

Particular embodiments of the subject matter described in this specification can be implemented so as to realize one or more of the following advantages. Using variablized secrets in a pipeline integration system enables users to change the secrets required for a job without modifying the task definitions of the pipeline itself. This allows users to submit job requests with an arbitrary set of new secrets without reconfiguring the pipeline.

Thus, the method decouples the pipeline from the parameters of the jobs it automates, thereby making the pipeline more flexible and robust to changes in the parameters. This means that the same pipeline can be used for more versions of workloads that are deployed by the pipeline. In other words, the workloads can iterate rapidly using the same pipeline without having to change the pipeline itself.

The techniques described below also make a cloud computing platform more secure. The techniques described below satisfy two goals for the secure handling of secrets that conventional methods do not. The first security goal is that the secrets should be ephemeral. In other words, they should only be available when required. This goal implies that secrets should not be written to file systems, both to avoid forensic recovery and to avoid side-channel attacks. The method achieves this goal by not writing any secrets to disk. The second security goal is that access to secrets should be as limited and strictly scoped as possible. For instance, full access to all secrets should not be given to any one execution environment, so that if the environment is compromised by an attacker, the attacker would not gain access to all secrets. The method achieves this goal by only giving access to a secrets database, which stores one or more secrets to be used by the pipeline, to the pipeline controller itself, which does not itself run workloads.

The techniques described below also increase flexibility by allowing a configuration file to be reused across distributed systems, instead of requiring a configuration file to be reformatted for every different pipeline.

The techniques described below also allow users of the pipeline to use secrets in their configuration without having to have access to the secrets management system. This means a first user can allocate the secrets and a second user can consume the secrets.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
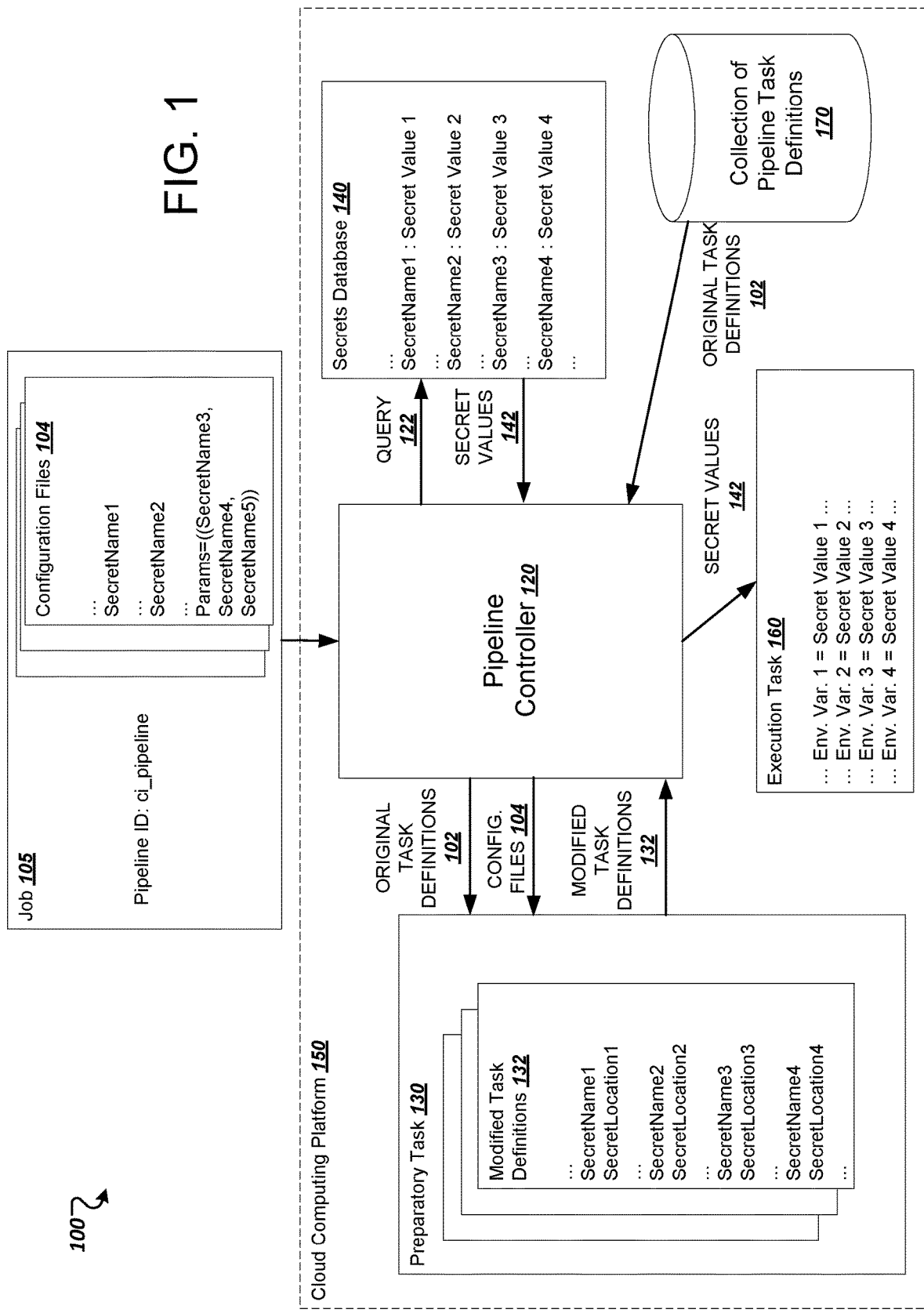
FIG. 1 is a diagram that illustrates an example pipeline integration system.

FIG. 1 is a diagram that illustrates an example pipeline integration system 100. The pipeline integration system 100 is an example of a system that can be used to implement the techniques described in this specification. In particular, the pipeline integration system 100 can dynamically handle a change in secrets topology without breaking an existing pipeline. This means that the task definitions of an existing pipeline can still be reused even when the secrets topology of the job changes for particular versions of a task.

The example pipeline integration system 100 includes a pipeline controller 120 that can receive a job 105, which can be uploaded to a cloud computing platform 150 by a user.

The job 105 identifies a particular pipeline either explicitly or implicitly. In this example, the job 105 includes an explicit identifier for a pipeline named "cipipeline," which for example might represent the tasks required to perform continuous integration of an application on the cloud computing platform 150.

The job 105 also includes one or more configuration files for each task that will be executed by the pipeline. The pipeline controller 120 can store and maintain the actual task definitions for the pipeline in a collection of pipeline task definitions 170. Each task definition can specify information required to perform a particular task in the pipeline, e.g., binaries, source code, networks, or some combination of these, that are needed to execute a task in the cloud computing platform 150. For example, a task definition can specify a container image or a virtual machine image that provides an execution environment for the task to execute. Task definitions can also specify data transfer between tasks. In other words, a task definition can specify that its output will be consumed by a subsequent task in the pipeline.

The pipeline controller 120 can then provision and launch tasks to effectuate the pipeline, including a preparatory task 130 and an execution task 160. The cloud computing platform also includes a secrets database 140 that the pipeline controller 120 can use to manage secrets for the job 105.

As described above, the cloud computing platform 150 can be implemented as a software layer on an underlying cloud computing infrastructure, which can include a plurality of computers in one more locations. For example, the cloud computing platform 150 can be installed on a plurality of computers in one or more data centers.

The configuration files 104 of the job 105 can specify the names of one or more secrets to be used by tasks during execution of the pipeline. The secret names correspond to secrets stored in the secrets database 140. The referenced secrets can include secrets needed to access resources required for the particular tasks of the job 105.

Some of the secret names in the configuration files 104 can correspond to secrets that are already integrated into the original task definitions 102 of the pipeline. For example, the configuration files illustrated in FIG. 1 explicitly specify the following secret names: SecretName1 and SecretName2.

The configuration files 104 can also include variablized secret names that are specified in the value of a special reserved variable having a particular reserved key. In this case, the key name is "Params," and the value of the reserved variable include other secret names that the pipeline controller 120 can discover dynamically at pipeline preparation time. In other words, the secrets that are specified as the values of the reserved variable can be used even when the task definitions of the pipeline do not include any of the variablized secret names.

Thus, a user can easily add a new secret to a pipeline by modifying the value of the "Params" variable, which does not require modifying any of the task definitions of the pipeline. Therefore, modifying the secrets topology of a pipeline does not require waiting on another entity to modify the task definitions of the pipeline.

Before invoking the execution tasks as defined in the original task definitions 102 of the pipeline, the pipeline controller 120 can retrieve the referenced secrets from the secrets database 140. In order to retrieve the secrets from the secrets database 140, the pipeline controller 120 can extract from the configuration files 104 the secret names and the locations of the secrets within the secrets database 140.

The pipeline controller 120 can launch a preparatory task 130 on the cloud computing platform 150 in order to dynamically extract secret names and their locations. To do so, the pipeline controller 120 can provide the preparatory task 130 with the original task definitions 102 of the pipeline as well as the configuration files 104 provided by the user.

The preparatory task 130 receives the original task definitions 102 and the configuration files 104 and parses the configuration files 104 to extract variablized secret names. For every extracted secret name, the preparatory task 130 can infer a secret location. The process is described in more detail below with reference to FIG. 3. The preparatory task 130 can then create modified task definitions 132 by inserting both the variablized secret names and the secret locations into the original task definitions 102 for the specified pipeline. The preparatory task 130 can then provide the modified task definitions 132 to the pipeline controller 120.

The pipeline controller 120 receives the modified task definitions 132 and parses them to extract the secret names and secret locations. For each such (secret name, secret location) pair, the pipeline controller 120 submits a query 122 to the secrets database 140, requesting the corresponding secret that can be found in the given secret location. The secrets database 140 retrieves the queried secret values 142 and provides them to the pipeline controller 120.

Having received all secret values 142, the pipeline controller 120 can invoke the execution tasks necessary to complete the job. To do so, the pipeline controller 120 can provision an execution environment 160 within the cloud computing platform 150 to execute one or more execution tasks required for the job 105. The execution tasks, as defined in the modified task definitions 132, can access secret values 142 of the variablized secrets during execution. The pipeline controller 120 can inject the secret values 142 into the execution environment 160, e.g., in the form of environment variables of the execution environment 160. In some implementations, the environment variables are never written to the disk, thereby keeping the secret values ephemeral during execution of the job.

The one or more execution tasks are then executed within the execution environment 160. The execution tasks can access the variablized secret values 142 that were injected as environment variables into the execution environment 160. As illustrated, the execution task 160 can access environment variables that correspond to the secret names specified explicitly in the configuration files 104, as well as environment variables that correspond to the variablized secret names that were discovered dynamically and that were not referenced in the original task definitions 102.

One example of a job that can be executed in the pipeline integration system 100 is a pipeline that builds, tests, and deploys an application on a cloud-based computing platform 150. In this case, the original task definitions 102 submitted by the user can describe build, test, and deployment tasks. The pipeline controller 120 can then provision tasks in the execution environment 160 for effectuating the deployment of the application.

If an updated version of the application requires an additional secret, a user can simply add the secret name as a variablized secret in the input configuration file. The preparatory task 130 will then discover the secret name dynamically and generate modified task definitions. This process thereby allows the user to reuse the same pipeline even though the topology of the secrets required changes.

Figure 2:
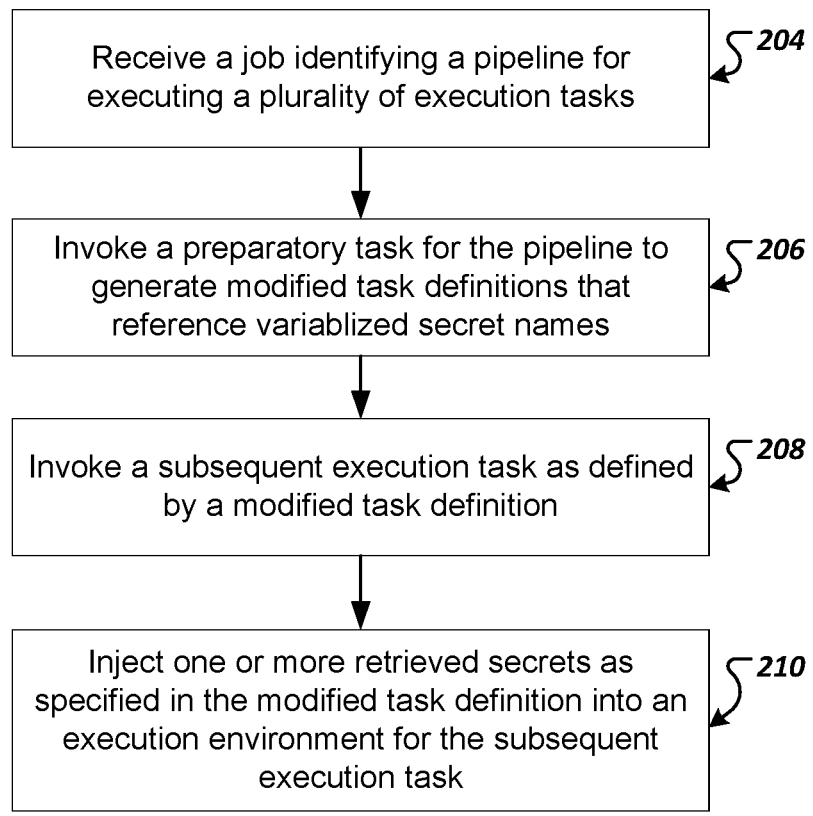
FIG. 2 is a flowchart of an example process of a pipeline controller handling a job request.

FIG. 2 is a flowchart of an example process of a pipeline controller handling a job request. The example process can be implemented by a distributed computing system having a plurality of computers in one or more locations and programmed in accordance with this specification.

The pipeline controller receives a job identifying a pipeline for executing a plurality of tasks (step 204). The job can include configuration files and can identify explicitly or implicitly a pipeline having one or more original task definitions. The configuration files can include one or more variablized secret names that are specified as values of a reserved variable.

The pipeline controller invokes a preparatory task to generate modified task definitions that reference variablized secret names (step 206). The pipeline controller can provide the preparatory task with the original task definitions and the configuration files. In some implementations, the pipeline controller provisions an execution environment, e.g., a container or a virtual machine, on a cloud computing platform to execute the preparatory task.

The pipeline controller can provide the original task definitions and configuration files to the preparatory task in a variety of ways. For example, the pipeline controller can mount the original task definitions and the configuration files to a file system that will be accessed by the preparatory task when launched. Alternatively or in addition, the pipeline controller can launch a preparatory task that is configured to query the pipeline controller for a location of the original task definitions and configuration files or for the files themselves. The preparatory task is explained in more detail below with reference to FIG. 3.

After the preparatory task is complete, the pipeline controller receives the modified task definitions. In some implementations, the preparatory task writes the modified task definitions to the disk so that the pipeline controller can access the modified task definitions. This does not violate the ephemerality goal for the secure handling of secrets, however, because while the secret names and secret locations can be stored in the modified task definitions, the modified task definitions generally do not include the secret values themselves. Thus, even if an adversary gains access to the disk, the adversary will be unable to retrieve the secrets from the secrets database because only properly verified entities may retrieve secrets from the secrets database.

The pipeline controller invokes a subsequent execution task, as defined by a modified task definition (step 208). The pipeline controller can invoke the subsequent execution task to effectuate one or more tasks as defined by the pipeline. This is explained in more detail below with reference to FIG. 4.

The pipeline controller injects one or more retrieved secrets as specified in the modified task definition into an execution environment for the subsequent execution task (step 210). This step is also explained in more detail below with reference to FIG. 4.

By using the preparatory task to generate modified task definitions, the pipeline controller does not need to know in advance what secrets will be required to execute the job request. Thus, the users submitting jobs can change the secrets required to execute the job without having to change the original task definitions of the pipeline. The users can thus add secrets, remove secrets, and change the variables of existing secrets, all while using the same pipeline. The users must simply include the variablized secret names for all required secrets in the configuration files, and the preparatory task will parse the configuration files and inject the secrets into the modified task definitions.

Figure 3:
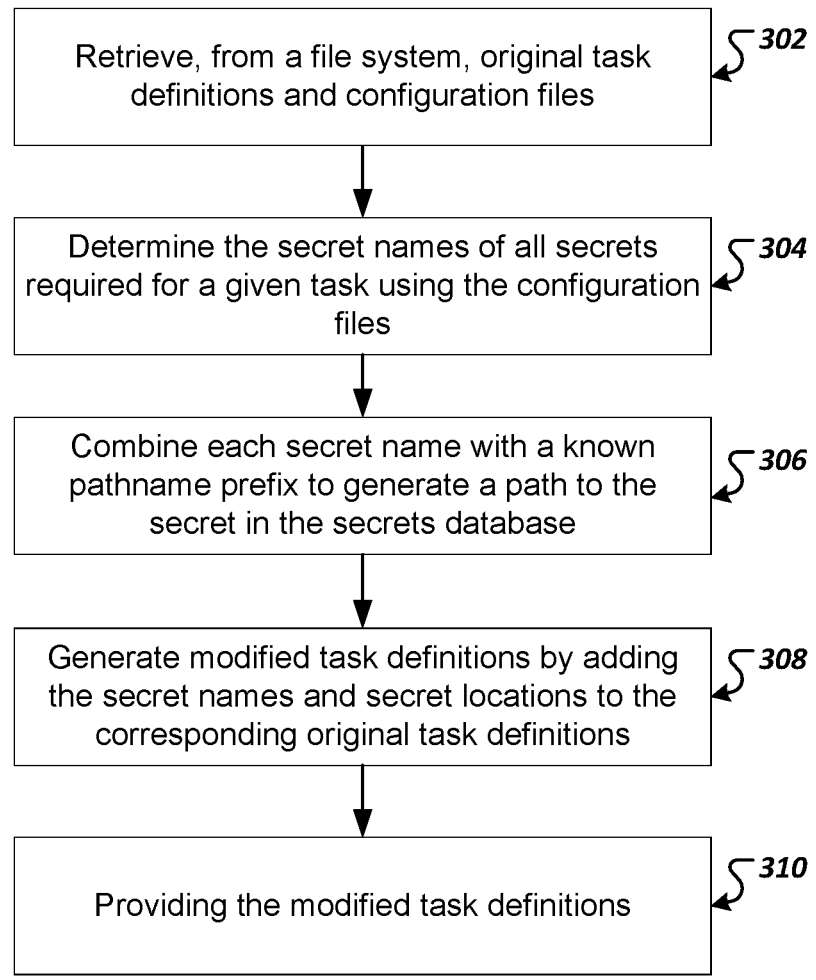
FIG. 3 is a flowchart of an example process performed by a preparatory task.

FIG. 3 is a flowchart of an example process performed by a preparatory task. The example process can be implemented by a distributed computing system having a plurality of computers in one or more locations and programmed in accordance with this specification.

The preparatory task retrieves, from a file system, original task definitions and configuration files (step 302). These were mounted there by the pipeline controller that invoked the preparatory task.

The preparatory task extracts the variablized secret names of all secrets required for a given task from the configuration files (step 304). Each secret name corresponds to a secret kept in a secrets database.

The preparatory task determines the location of every required secret (step 306). For each secret name, e.g., 'secret_name_1', the preparatory task 300 can infer the location of the corresponding secret within the secrets database. One way to do this is to take a known pathname prefix, say 'my_organization/my_team/secrets/', and append the secret name to the pathname prefix to create a full pathname, in this case 'my_organization/my_team/secrets/secret_name_1'. In this example, the pathname prefix is known according to the team to which the user who requested the application deployment belongs.

The preparatory task generates modified task definitions by inserting each secret name and location into the original task definition file that corresponds with the task that requires the respective secret (step 308).

The preparatory task provides the modified task definitions (310). For example, the preparatory task can provide the modified task definitions as outputs to the pipeline controller. In some implementations, the preparatory task can mount the modified task definitions to the file system, which the pipeline controller can access.

This process illustrates another main advantage of the current invention, namely that the preparatory task satisfies the "strict-scoping" goal for the secure handling of secrets. In other words, the preparatory task itself does not have access to the entire secrets database. Rather, the preparatory task only parses secret names and infers secret locations. Thus, even if an adversary gained access to the preparatory task, the adversary would not have access to the secrets database.

Figure 4:
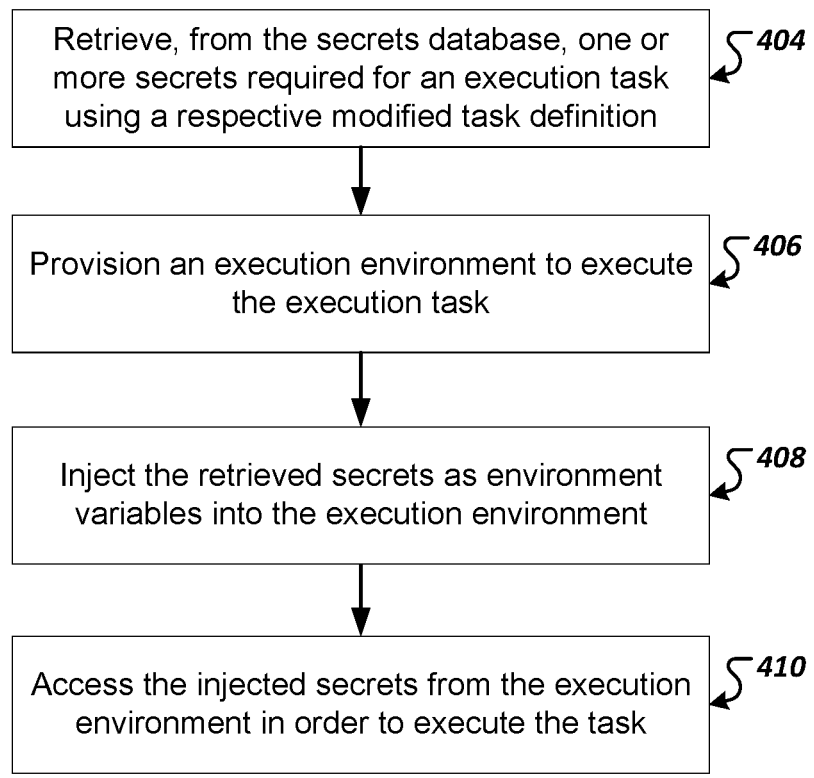
FIG. 4 is a flowchart of an example process for launching one or more execution tasks that access variablized secrets.

FIG. 4 is a flowchart of an example process for launching one or more execution tasks that access variablized secrets. A pipeline controller can launch an execution task executing a task defined in a respective modified task definition. The example process can be implemented by a distributed computing system having a plurality of computers in one or more locations and programmed in accordance with this specification.

The pipeline controller retrieves, from the secrets database, one or more secrets required for an execution task using a respective modified task definition for the execution task (404). For example, the modified task definition can be generated by a preparatory task as described above with reference to FIG. 3. To retrieve the secrets, the pipeline controller can extract one or more secret names and locations from a modified task definition and use the extracted names and locations to retrieve the one or more respective secrets from the secrets database.

The pipeline controller provisions an execution environment to execute the execution task (step 406). In some implementations, the respective modified task definition comprises directives for an underlying provisioning system that can provision resources in the underlying cloud computing infrastructure. In some implementations, the respective modified task definition is a manifest that can be understood by a deployment director of the pipeline controller. A deployment directory is a software subsystem that can provision appropriate resources in the underlying cloud computing infrastructure. One example of a deployment director is the open source BOSH project, which can be used to deploy and manage the lifecycles of software on large-scale distributed systems.

The pipeline controller injects the retrieved secrets into the provisioned environment in the form of environment variables (step 408). For example, the pipeline controller can configure the execution environment to have environment variables corresponding to the variablized secret names.

The execution task executes the task in the provisioned execution environment by accessing the environment variables that represent the injected secrets (step 410). In this way, the execution task is able to access and use variablized secrets that were not referenced in the original task definitions of the pipeline.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving, by a pipeline controller, a job identifying a pipeline for executing a plurality of tasks, the job comprising one or more configuration files that include a reserved variable whose value represents one or more variablized secret names of secrets to be used by one or more tasks of a plurality of tasks of the identified pipeline;
  invoking, by the pipeline controller, a preparatory task for the pipeline, wherein the preparatory task performs operations comprising:
    obtaining one or more original task definitions for the identified pipeline,
    determining, using the one or more configuration files, which secrets are required for each respective task of the plurality of tasks of the pipeline;
    generating, from the original task definitions, one or more modified task definitions for the pipeline, wherein each modified task definition references one or more variablized secret names specified as the value of the reserved variable of the one or more configuration files;
  invoking, by the pipeline controller, one or more subsequent execution tasks using each respective modified task definition, including, for each subsequent invocation of a particular execution task, performing operations comprising:
    retrieving, by the pipeline controller from the secrets database, one or more secrets specified by a modified task definition for the particular execution task;

injecting, by the pipeline controller, the one or more retrieved secrets into an execution environment for the particular execution task; and accessing, by the particular execution task, the one or more injected secrets from the execution environment of the particular task.

Embodiment 2 is the method of embodiment 1, wherein the configuration files include one or more variablized secret names that are not referenced in the original task definitions of the identified pipeline.

Embodiment 3 is the method of any one of embodiments 1-2, further comprising:

receiving a modified configuration file that includes a new variablized secret name to be used by a particular task of the pipeline; and executing the one or more execution tasks of the pipeline without modifying task definitions of the pipeline to reference the new variablized secret name.

Embodiment 4 is the method of embodiment 3, wherein the new variablized secret name identifies a secret for accessing a resource for a new version of an application to be executed by a task of the pipeline.

Embodiment 5 is the method of any one of embodiments 1-4, wherein the configuration files never contain the values of any secrets.

Embodiment 6 is the method of any one of embodiments 1-5, wherein the plurality of tasks comprise one or more tasks to deploy an application on a cloud-based computing platform.

Embodiment 7 is the method of any one of embodiments 1-6, wherein invoking, by a pipeline controller, a preparatory task for the pipeline comprises mounting the original task definitions for the pipeline and the configuration files to a file system and executing the preparatory task in an execution environment that can read the file system.

Embodiment 8 is the method of any one of embodiments 1-7, wherein the retrieved secrets do not exist outside the secrets database except as environment variables in the execution environment of the particular task.

Embodiment 9 is the method of any one of embodiments 1-8, wherein the particular execution environment does not have access to the secrets database.

Embodiment 10 is the method of any one of embodiments 1-9, wherein determining a location for each secret comprises, for every secret, extracting a secret name from a configuration file and combining the secret name with a known pathname prefix to create a path to the secret in the secrets database.

Embodiment 11 is a system comprising: a plurality of computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method performed by a system comprising a plurality of computers, the method comprising:

receiving, by a pipeline controller, a job identifying a pipeline for executing a plurality of tasks, the job comprising one or more configuration files that include a reserved variable whose value represents one or more variablized secret names of secrets to be used by one or more tasks of the plurality of tasks of the identified pipeline;

invoking, by the pipeline controller, a preparatory task for the pipeline, wherein the preparatory task performs operations comprising:

obtaining one or more original task definitions for the identified pipeline, determining, using the one or more configuration files, which secrets are required for each respective task of the plurality of tasks of the pipeline;

generating, from the original task definitions, one or more modified task definitions for the pipeline, wherein each modified task definition references the one or more variablized secret names specified as the value of the reserved variable of the one or more configuration files;

invoking, by the pipeline controller, one or more subsequent execution tasks using each respective modified task definition, including, for each subsequent invocation of a particular execution task, performing operations comprising:

retrieving, by the pipeline controller from a secrets database, one or more secrets specified by a modified task definition for the particular execution task;

injecting, by the pipeline controller, the one or more retrieved secrets into an execution environment for the particular execution task; and accessing, by the particular execution task, the one or more injected secrets from the execution environment of the particular execution task.

2. The method of claim 1, wherein the one or more configuration files include one or more variablized secret names that are not referenced in the original task definitions of the identified pipeline.

3. The method of claim 1, further comprising:
receiving a modified configuration file that includes a new variablized secret name to be used by a particular task of the plurality of tasks of the pipeline; and
executing the one or more execution tasks of the pipeline without modifying definitions of any of the plurality of tasks of the pipeline to reference the new variablized secret name.

4. The method of claim 3, wherein the new variablized secret name identifies a secret for accessing a resource for a new version of an application to be executed by one of the plurality of tasks of the pipeline.

5. The method of claim 1, wherein the one or more configuration files never contain the values of any secrets.

6. The method of claim 1, wherein the plurality of tasks comprise one or more tasks to deploy an application on a cloud-based computing platform.

7. The method of claim 1, wherein invoking, by the pipeline controller, the preparatory task for the pipeline comprises mounting the original task definitions for the pipeline and the one or more configuration files to a file system and executing the preparatory task in an execution environment that can read the file system.

8. The method of claim 1, wherein the retrieved secrets do not exist outside the secrets database except as environment variables in the execution environment of the particular task.

9. The method of claim 1, wherein the execution environment of the particular task does not have access to the secrets database.

10. The method of claim 1, wherein determining a location for each secret comprises, for every secret, extracting a secret name from a configuration file and combining the secret name with a known pathname prefix to create a path to the secret in the secrets database.

11. A system comprising:
one or more computers and one or more storage devices storing instructions that are operable, when executed by the one or more computers, to cause the one or more computers to perform operations comprising:
receiving, by a pipeline controller, a job identifying a pipeline for executing a plurality of tasks, the job comprising one or more configuration files that include a reserved variable whose value represents one or more variablized secret names of secrets to be used by one or more tasks of the plurality of tasks of the identified pipeline;
invoking, by the pipeline controller, a preparatory task for the pipeline, wherein the preparatory task performs operations comprising:
obtaining one or more original task definitions for the identified pipeline,
determining, using the one or more configuration files, which secrets are required for each respective task of the plurality of tasks of the pipeline;
generating, from the original task definitions, one or more modified task definitions for the pipeline, wherein each modified task definition references the one or more variablized secret names specified as the value of the reserved variable of the one or more configuration files;

invoking, by the pipeline controller, one or more subsequent execution tasks using each respective modified task definition, including, for each subsequent invocation of a particular execution task, performing operations comprising:
retrieving, by the pipeline controller from a secrets database, one or more secrets specified by a modified task definition for the particular execution task;
injecting, by the pipeline controller, the one or more retrieved secrets into an execution environment for the particular execution task; and
accessing, by the particular execution task, the one or more injected secrets from the execution environment of the particular execution task.

12. The system of claim 11, wherein the one or more configuration files include one or more variablized secret names that are not referenced in the original task definitions of the identified pipeline.

13. The system of claim 11, wherein the operations further comprise:
receiving a modified configuration file that includes a new variablized secret name to be used by a particular task of the plurality of tasks of the pipeline; and
executing the one or more execution tasks of the pipeline without modifying definitions of any of the plurality of the pipeline to reference the new variablized secret name.

14. The system of claim 13, wherein the new variablized secret name identifies a secret for accessing a resource for a new version of an application to be executed by a one of the plurality of task of the pipeline.

15. The system of claim 11, wherein the one or more configuration files do not contain the values of any secrets.

16. The system of claim 11, wherein the plurality of tasks comprise one or more tasks to deploy an application on a cloud-based computing platform.

17. The system of claim 11, wherein invoking, by the pipeline controller, the preparatory task for the pipeline comprises mounting the original task definitions for the pipeline and the one or more configuration files to a file system and executing the preparatory task in an execution environment that can read the file system.

18. The system of claim 11, wherein the retrieved secrets do not exist outside the secrets database except as environment variables in the execution environment of the particular task.

19. The system of claim 11, wherein the execution environment of the particular task does not have access to the secrets database.

20. The system of claim 11, wherein determining a location for each secret comprises, for every secret, extracting a secret name from a configuration file and combining the secret name with a known pathname prefix to create a path to the secret in the secrets database.

21. One or more non-transitory computer storage media encoded with computer program instructions that when executed by a plurality of computers cause the plurality of computers to perform operations comprising:
receiving, by a pipeline controller, a job identifying a pipeline for executing a plurality of tasks, the job comprising one or more configuration files that include a reserved variable whose value represents one or more variablized secret names of secrets to be used by one or more tasks of the plurality of tasks of the identified pipeline;

invoking, by the pipeline controller, a preparatory task for the pipeline, wherein the preparatory task performs operations comprising:
- obtaining one or more original task definitions for the identified pipeline,
- determining, using the one or more configuration files, which secrets are required for each respective task of the plurality of tasks of the pipeline;
- generating, from the original task definitions, one or more modified task definitions for the pipeline, wherein each modified task definition references the one or more variablized secret names specified as the value of the reserved variable of the one or more configuration files;

invoking, by the pipeline controller, one or more subsequent execution tasks using each respective modified task definition, including, for each subsequent invocation of a particular execution task, performing operations comprising:
- retrieving, by the pipeline controller from a secrets database, one or more secrets specified by a modified task definition for the particular execution task;
- injecting, by the pipeline controller, the one or more retrieved secrets into an execution environment for the particular execution task; and
- accessing, by the particular execution task, the one or more injected secrets from the execution environment of the particular execution task.

* * * * *